US011700782B2

(12) United States Patent
Putz

(10) Patent No.: US 11,700,782 B2
(45) Date of Patent: Jul. 18, 2023

(54) DRIVE SHAFT CONNECTING UNIT

(71) Applicant: SYN TRAC GmbH, Bad Goisern (AT)

(72) Inventor: Stefan Putz, Bad Goisern (AT)

(73) Assignee: SYN TRAC GMBH, Bad Goisern (AT)

( * ) Notice: Subject to any disclaimer, the term of this patent is extended or adjusted under 35 U.S.C. 154(b) by 435 days.

(21) Appl. No.: 16/870,433

(22) Filed: May 8, 2020

(65) Prior Publication Data

US 2020/0267887 A1    Aug. 27, 2020

Related U.S. Application Data

(63) Continuation of application No. PCT/EP2018/080821, filed on Nov. 9, 2018.

(30) Foreign Application Priority Data

Nov. 10, 2017    (DE) .................... 10 2017 126 497.3

(51) Int. Cl.
  *A01B 71/06*    (2006.01)
  *B60K 17/28*    (2006.01)
  *F16D 3/06*    (2006.01)

(52) U.S. Cl.
  CPC ............. *A01B 71/06* (2013.01); *B60K 17/28* (2013.01); *F16D 3/06* (2013.01)

(58) Field of Classification Search
  CPC ..... A01B 71/06; A01B 59/042; A01B 59/062; B60K 17/28; F16D 3/06
  See application file for complete search history.

(56) References Cited

U.S. PATENT DOCUMENTS

| | | | | |
|---|---|---|---|---|
| 3,613,816 A | * | 10/1971 | Gutbrod | B62D 49/0635 180/234 |
| 4,203,306 A | * | 5/1980 | Sehlbach | F16D 1/096 403/370 |
| 4,733,738 A | | 3/1988 | Rowe | |
| 5,041,062 A | * | 8/1991 | Dornhoff | F16H 57/05 474/144 |
| 5,193,623 A | | 3/1993 | Burette | |
| 5,718,634 A | | 2/1998 | Mikeska et al. | |
| 2002/0157892 A1 | * | 10/2002 | Seipold | B60K 17/28 180/379 |
| 2008/0000322 A1 | * | 1/2008 | Hillyer | F16H 63/3023 74/665 G |

(Continued)

FOREIGN PATENT DOCUMENTS

| | | |
|---|---|---|
| DE | 4132889 A1 | 4/1992 |
| DE | 4441218 A1 | 5/1996 |

(Continued)

OTHER PUBLICATIONS

International Search Report for International Application No. PCT/EP2018/080821 dated Feb. 19, 2019.

*Primary Examiner* — Frank B Vanaman
(74) *Attorney, Agent, or Firm* — Stephen J. Kenny; Vincenzo DiMonaco; Foley Hoag LLP

(57) ABSTRACT

According to the disclosure a drive shaft connecting unit is provided. This comprises a vehicle-side drive shaft connecting device according to the disclosure and an accessory-side drive shaft connecting device according to the disclosure which can be releasably and interlockingly connected thereto and coupled therewith.

13 Claims, 8 Drawing Sheets

(56) References Cited

U.S. PATENT DOCUMENTS

| | | | |
|---|---|---|---|
| 2011/0299971 A1* | 12/2011 | Lemmers, Jr. | F01D 11/10 |
| | | | 415/122.1 |
| 2015/0183454 A1 | 7/2015 | Lee | |
| 2015/0334910 A1* | 11/2015 | Treffer | A01B 59/042 |
| | | | 280/494 |
| 2015/0367728 A1* | 12/2015 | Neumann | B60K 25/02 |
| | | | 74/15.6 |
| 2016/0115999 A1 | 4/2016 | Huegerich | |

FOREIGN PATENT DOCUMENTS

| | | |
|---|---|---|
| DE | 60209396 T2 | 12/2006 |
| EP | 1252807 A1 | 10/2002 |
| EP | 3011816 A1 | 4/2016 |
| JP | S6420007 A | 1/1989 |
| JP | H0441205 U | 4/1992 |
| JP | 2009/174707 A | 8/2009 |
| JP | 2017/61299 A | 3/2017 |
| KR | 20160011960 A | 2/2016 |
| WO | WO-9002481 A1 | 3/1990 |

* cited by examiner

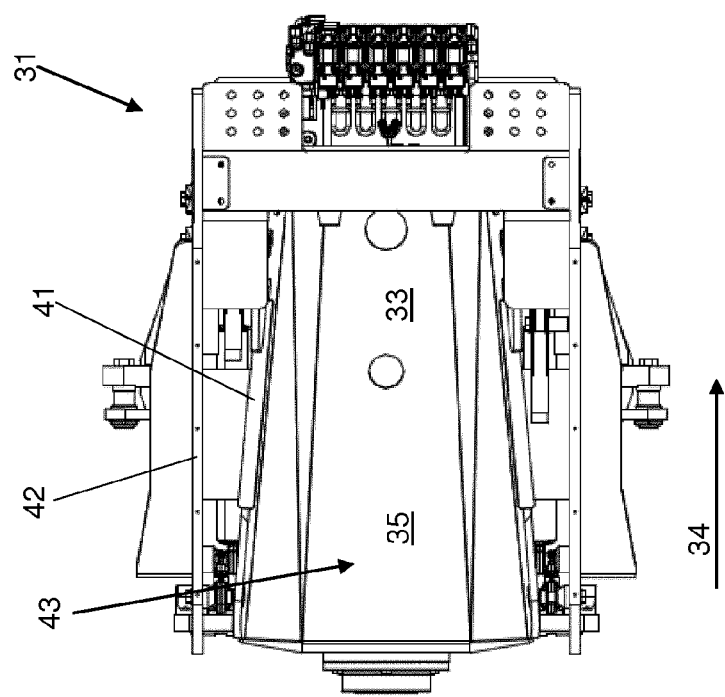
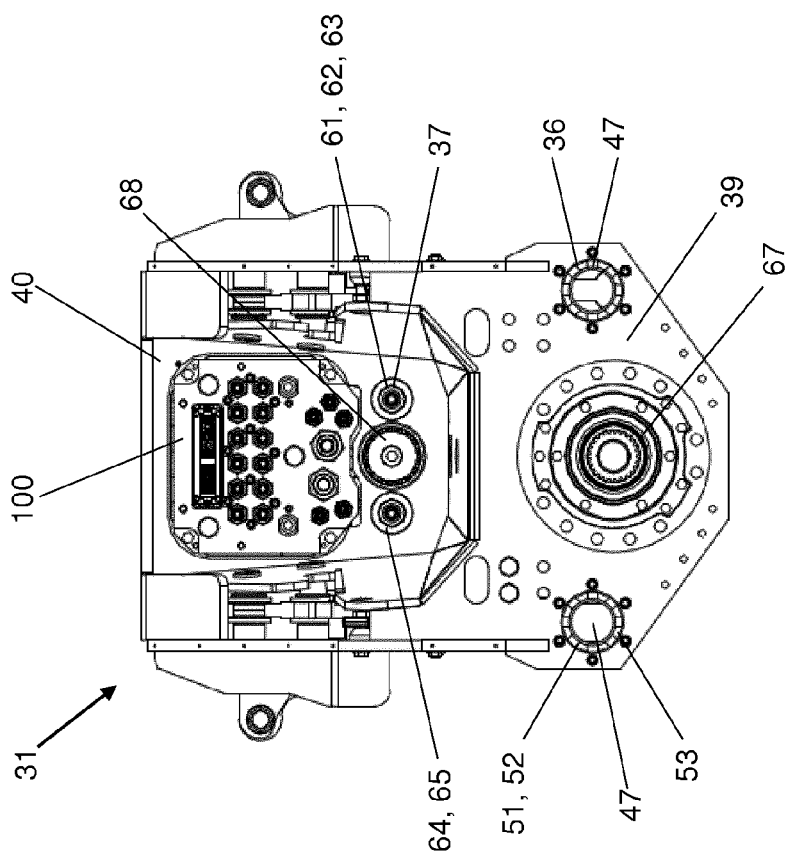

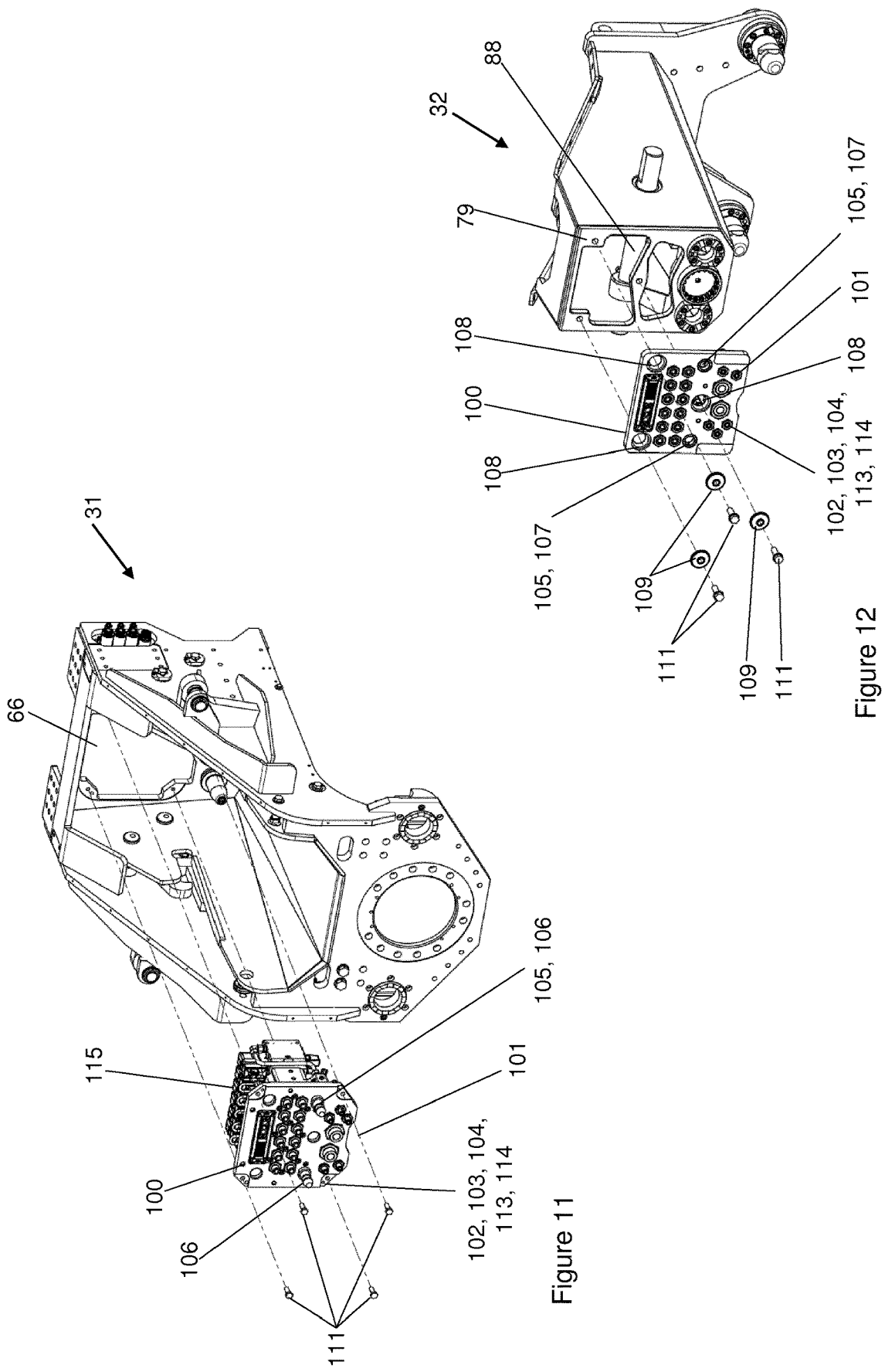

DRIVE SHAFT CONNECTING UNIT

CROSS-REFERENCE TO RELATED APPLICATIONS

This application is a Continuation of and claims the benefit of priority under 35 USC 120 to PCT/EP2018/080821 filed Nov. 9, 2018, which claims priority to DE 10 2017 126 497.3 filed Nov. 10, 2017, the entire contents of each are hereby incorporated by reference.

The present disclosure relates to a drive shaft connecting unit with a vehicle-side and an accessory-side drive shaft connecting device.

A drive shaft is a component, which serves to transmit power between a transmission and at least one propelled wheel and is a part of a drive train. In order to be able to follow deflection movements and the steering angle, joints are present, for which reason the generic term drive shaft is also used. For guided wheels however particularly homokinetic drive shafts are used.

A cardan shaft is a version of a drive shaft combination with one or two universal joints (also called U-joints). It enables torque to be transmitted in an articulated shaft train. The articulation angle may change during operation.

From the state of the art it is known to interconnect so-called power takeoffs. Power takeoffs are drive shafts of agricultural equipment, which transmit part of the energy from the engine by coupling with corresponding shafts of an accessory, e.g. a fodder mixer, a milling cutter or a mulcher. For this purpose the accessory is first mechanically connected to the agricultural vehicle and then the power-takeoffs are coupled with one another. Power takeoffs in this case are shafts which usually can operate at two fixed speeds, whereby normally a rear power takeoff goes off from the transmission-side, while a front power takeoff usually goes off from the engine side, the front power takeoff usually only reaching 30% of the output, which a rear power takeoff can generate.

In addition it is also known to provide so-called ground speed power takeoffs. Ground speed power takeoffs are power takeoffs, which are coupled with the drive train of an accessory with wheels, a ground speed power takeoff here likewise possessing fixed speeds and only representing traction support for accessories in the case of terrain, on which the accessory must also support the propulsion.

SUMMARY OF THE DISCLOSED SUBJECT MATTER

An aim of the disclosure is to create a flexibly connectable modular drive of a vehicle with which it is possible, in an automated and simple way, to enact different drive and wheel modifications. It is a further aim of the disclosure to create drive shaft connecting devices with which as part of the drive shaft connecting unit the same can be connected with one another in a simple manner.

According to the disclosure a drive shaft connecting unit is provided for making a modular drive and wheel arrangement possible, the drive shaft connecting unit consisting of two drive shaft connecting devices, whereby the drive shaft connecting devices are provided once on the vehicle-side and once on an attachment such as an arbour or a trailer.

Here these devices in each case are provided on a device for coupling a vehicle and an attachment, such as a trailer, an auxiliary axle or an accessory and in this case connected to these in an axially fixed manner so that if the vehicle is mechanically coupled with an auxiliary axle and/or a trailer and/or an accessory the drive shaft connecting devices are coupled by force with one another. Thus a modification can be made flexibly, quickly and in a simple way.

Such a coupling by force is not provided in the state of the art, because up till now a coupling with auxiliary axles or additional accessories does not happen there so that a "driving" connection could be made. In this case the corresponding connecting devices are each fixed on their respective coupling element so that if the coupling elements are telescoped into one another these parts are connected by force. Here in particular internal toothing of a connecting device engage with external toothing of another connecting device, so that the actuated coupling takes place via axial telescoping into one another. Fixing in the axial direction is due to the coupling elements alone.

A vehicle-side drive shaft connecting device according to the disclosure comprises a bearing seat and a coupling hub held so that it can swivel therein, the bearing seat being split in two and having a vehicle-side connecting flange and a coupling-side cover plate. The tubular connecting flange possesses a fastening section and a bearing section, whereby the fastening section on the vehicle-side on an outer jacket wall has a radially circumferential centering shoulder for centering the vehicle-side drive shaft connecting device for instance of a coupling device or of a vehicle and a roughly circular connecting section for connecting the vehicle-side drive shaft connecting device to a coupling device or to a vehicle. The fastening section forms a coupling-side part of a bearing retaining seat, which has a radially circumferential shoulder.

The cover plate is connected to the connecting flange by means of corresponding connecting units, whereby the cover plate forms a vehicle-side part of a bearing retaining seat which has a radially circumferential shoulder and on the coupling-side a passage for the coupling hub and whereby a bearing device is arranged in the bearing retaining seat by means of which the coupling hub is held in the bearing seat so that it can swivel.

The bearing device is connected to the coupling hub with a jacket wall of a tubular vehicle-side drive shaft retaining section. The drive shaft retaining section possesses internal toothing for connecting to correspondingly formed external toothing of a drive shaft of a vehicle and the coupling hub has a coupling-side cup-shaped coupling section with internal toothing for connecting to a correspondingly formed element of the accessory-side drive shaft connecting device.

An accessory-side drive shaft connecting device according to the disclosure comprises a cup-shaped bearing seat, a coupler and a bearing shaft, the bearing seat having a circular connecting unit section for connecting the accessory-side drive shaft connecting device to a coupling device or to an accessory and whereby a bearing retaining section is formed in a passage on an accessory-side end of the bearing device, which is limited on the accessory-side by a radially circumferential shoulder and is arranged in the bearing retaining section of a bearing device, whereby the bearing shaft is held so that it can swivel, which is connected to the bearing device with a bearing section formed on its outside jacket wall, and whereby the bearing shaft has an accessory-side shaft stump with external toothing for connecting to a drive shaft of an accessory, and whereby the bearing shaft on the coupling side has a cup-shaped coupler socket, the cup-shaped coupler socket on its outside jacket wall having a radially circumferential shoulder, which limits the bearing retaining section, and whereby the coupler is arranged in the cup-shaped coupler socket of the bearing shaft and fixed by means of a screwed joint and whereby the roughly cylindrical coupler on the coupling-side has external toothing for coupling with the correspondingly formed internal toothing of the coupling hub.

Diaphragm springs can be provided in the bearing retaining sections between the bearing devices and the corresponding shoulders, in order to protect the bearing devices from damage. Rotary shaft seals can be arranged between the bearing device and the cover plate of the vehicle-side drive shaft connecting device. Rotary shaft seals can also be provided between the cup-shaped bearing shaft and the bearing seat of the accessory-side drive shaft connecting device.

In the context of the present disclosure the expression "vehicle-side" signifies an end or a region or a side of a component, which points in the direction of a vehicle towards the longitudinal direction. In the context of the present disclosure the expression "accessory-side" signifies an end or a region or a side of a component, which points in the direction of an accessory towards the longitudinal direction. A region or a side of a component signifies a coupling-side or connecting-side end, which points towards a coupling or a connecting region of a coupling unit or a docking device. The drive shaft connecting unit according to the disclosure is described by way of example on the basis of the following drawings.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIG. 3: is a plan view from the front onto the docking socket,
FIG. 4: is a plan view from above onto the docking socket,
FIG. 11: is a perspective exploded view of a coupling plate and a docking socket,
FIG. 12: is a perspective exploded view of a further coupling plate and a docking insert.

DETAILED DESCRIPTION OF AN EXEMPLARY EMBODIMENT

Figure 2:
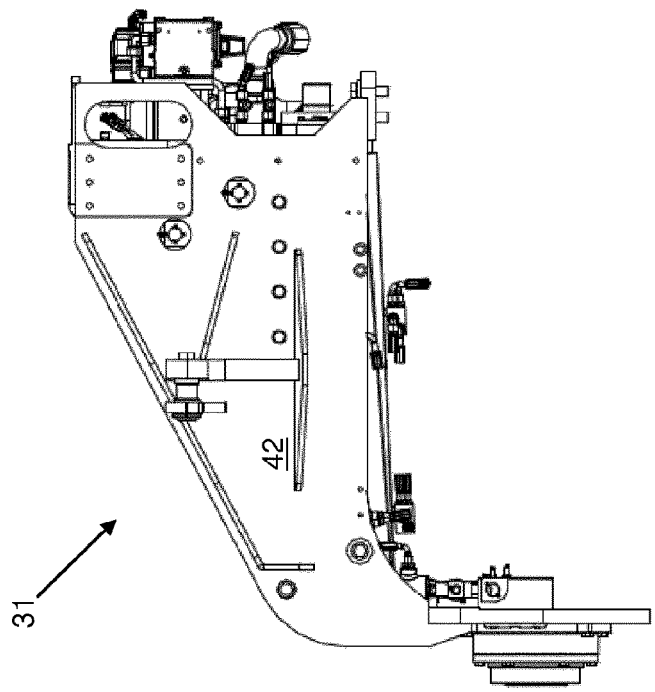
FIG. 2: is a lateral plan view onto the docking socket.
Figure 1:
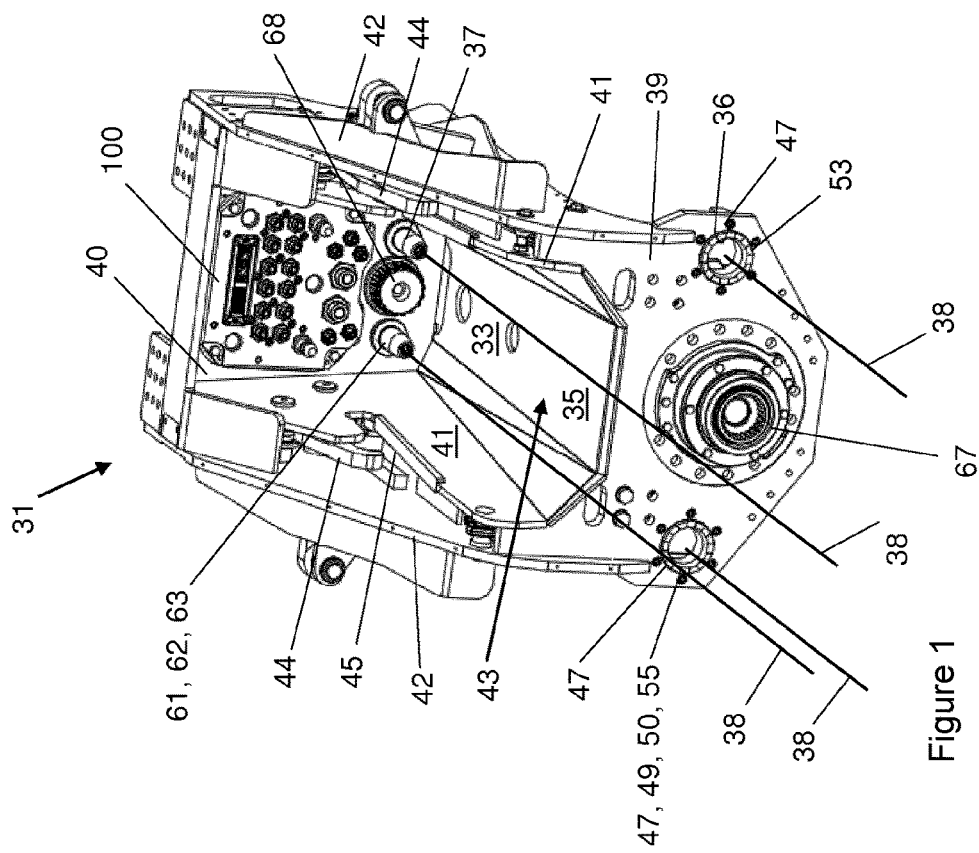
FIG. 1: is a perspective illustration of a docking socket.
Figure 6:
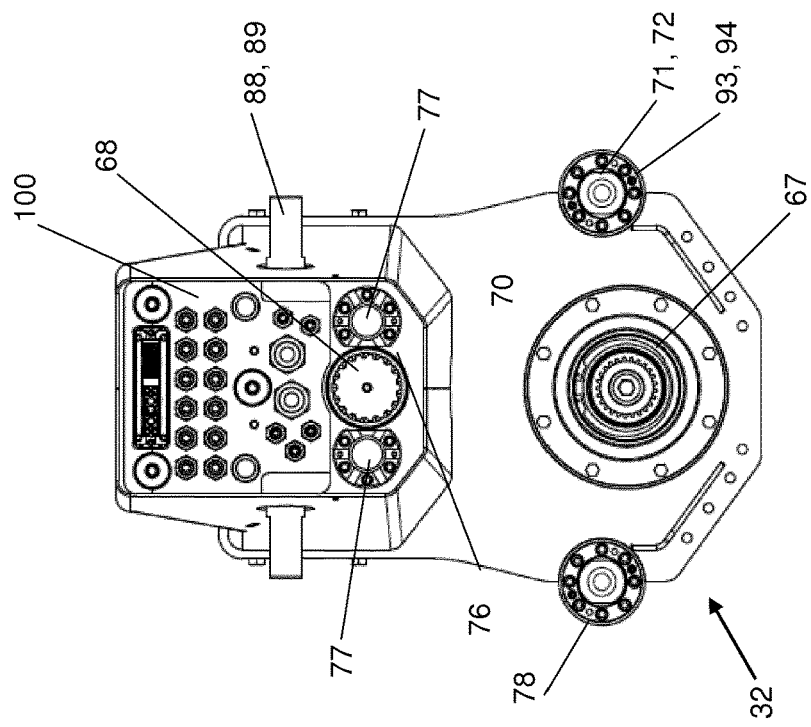
FIG. 6: is a plan view from the front onto the docking insert.
Figure 5:
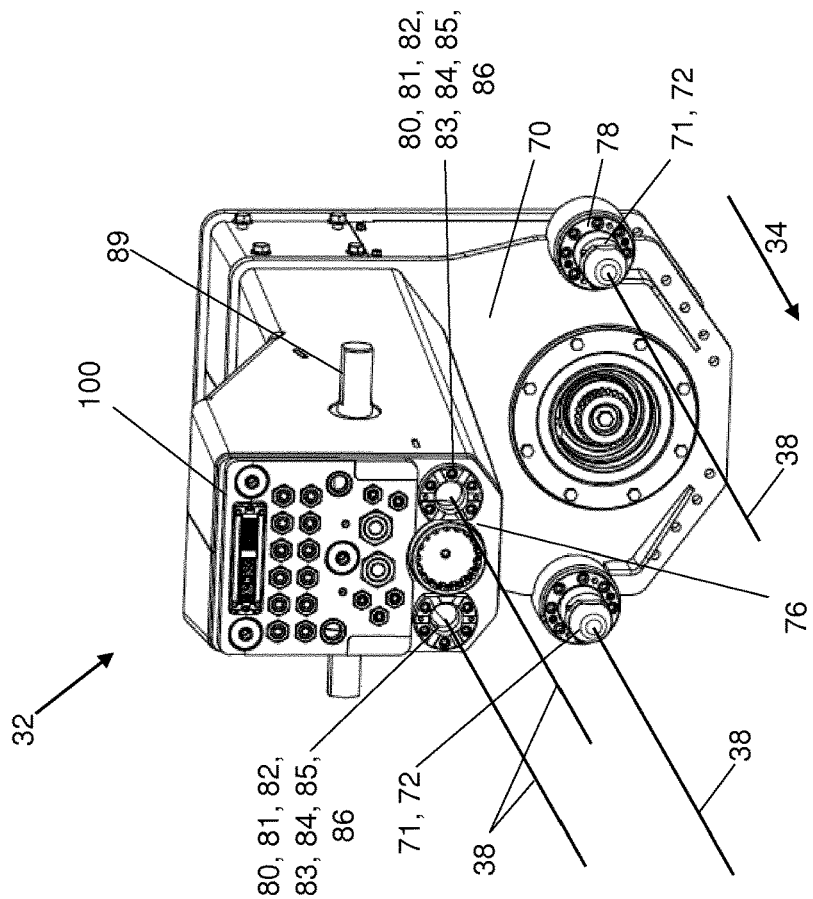
FIG. 5: is a perspective illustration of a docking insert.
Figure 8:
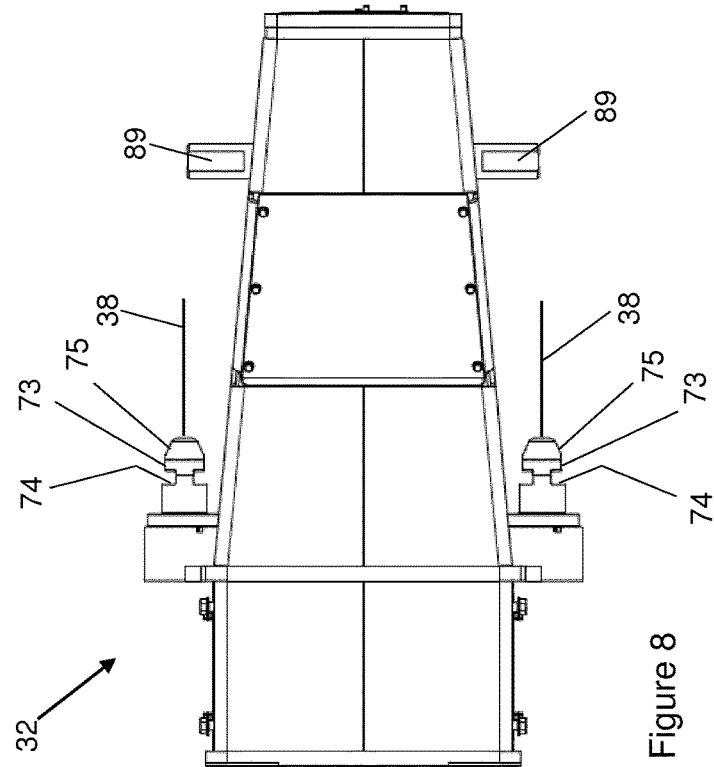
FIG. 8: is a plan view from above onto the docking insert.
Figure 7:
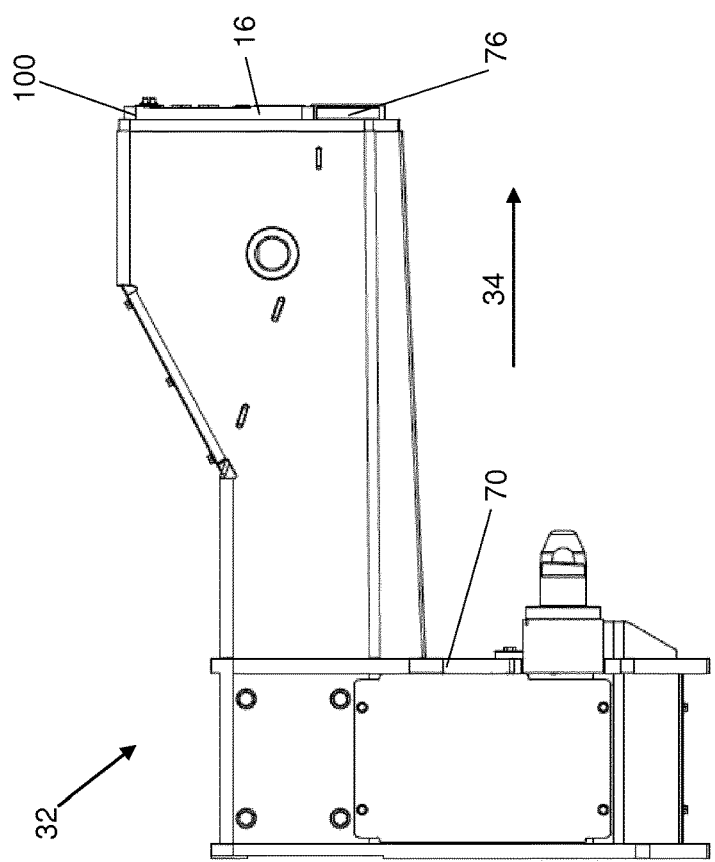
FIG. 7: is a lateral plan view onto the docking insert.
Figure 10:
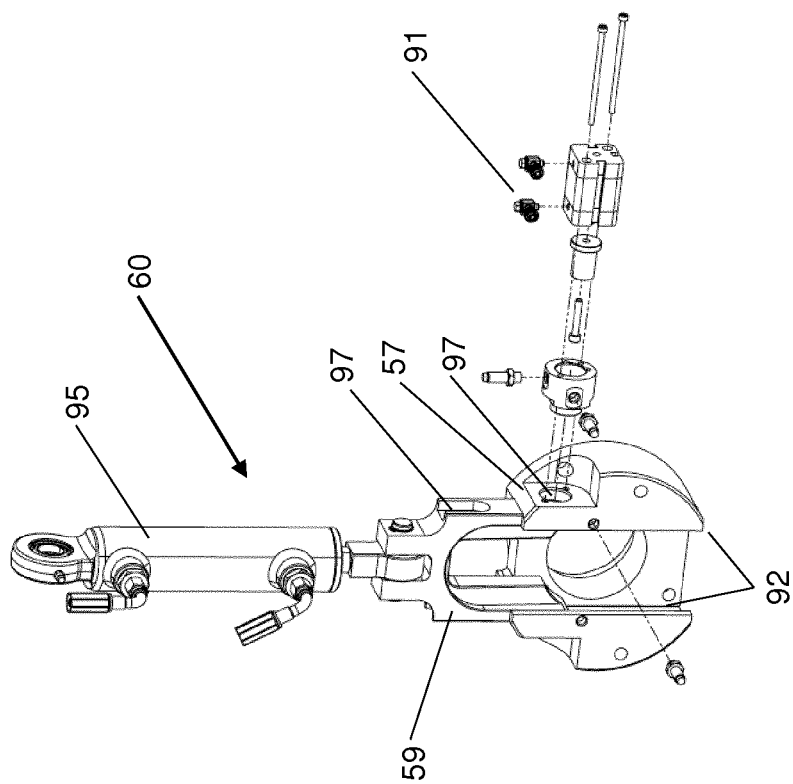
FIG. 10: is a further perspective partial exploded illustration of the wedge fork with hydraulic cylinder and the locking device.
Figure 9:
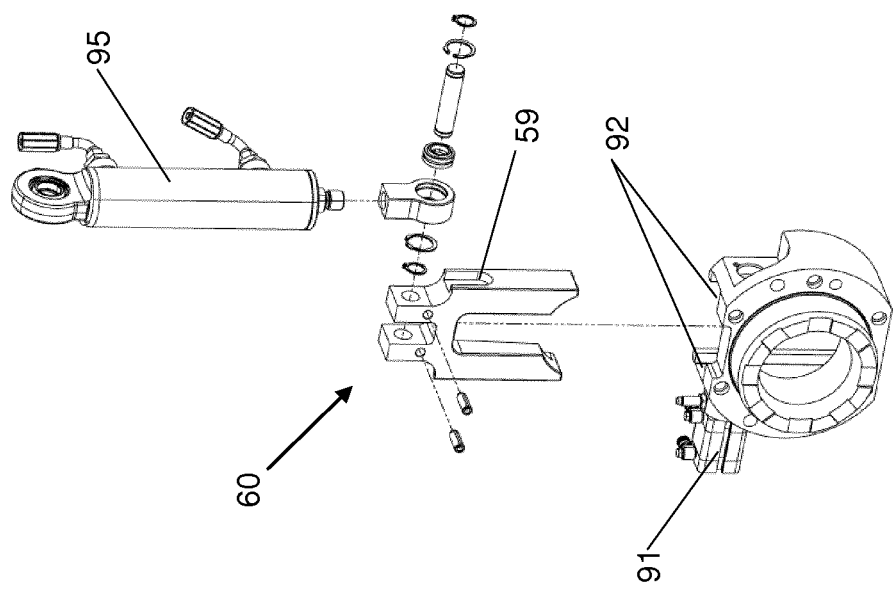
FIG. 9: is a perspective partial exploded illustration of a wedge fork with hydraulic cylinder and a locking device.
Figure 14:
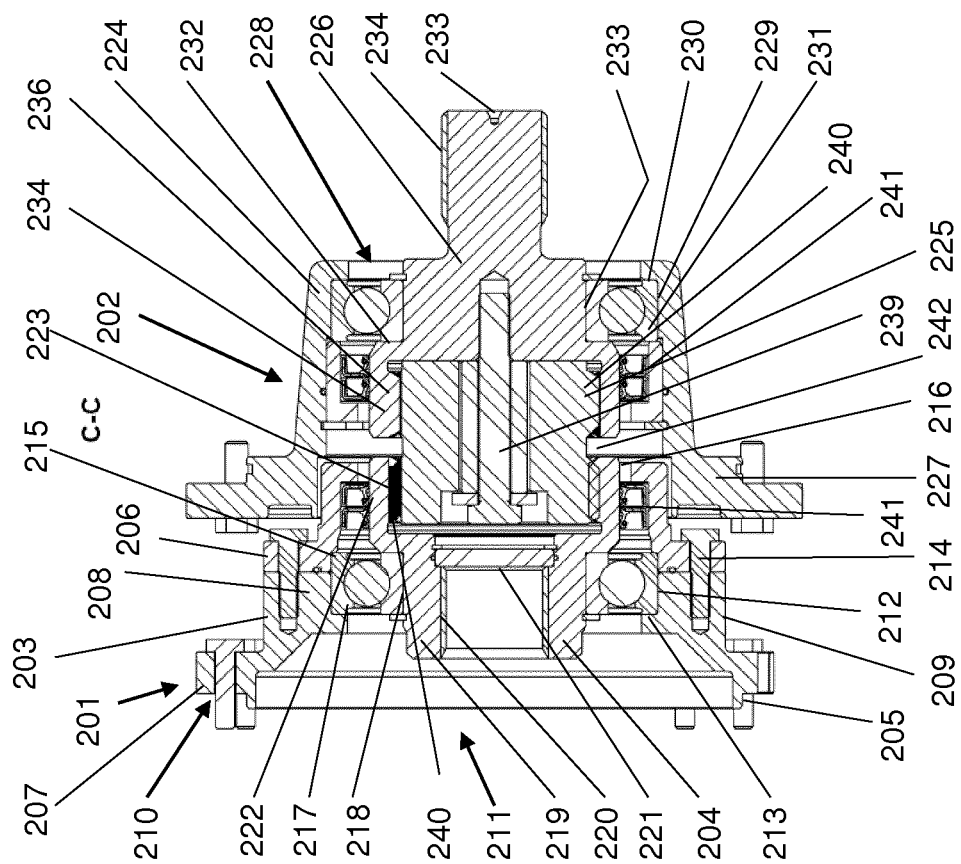
FIG. 14: is a cut along a plane cc through the drive shaft connecting unit in accordance with FIG. 13, and
FIG. 15: is a perspective exploded illustration of the drive shaft connecting unit.
Figure 13:
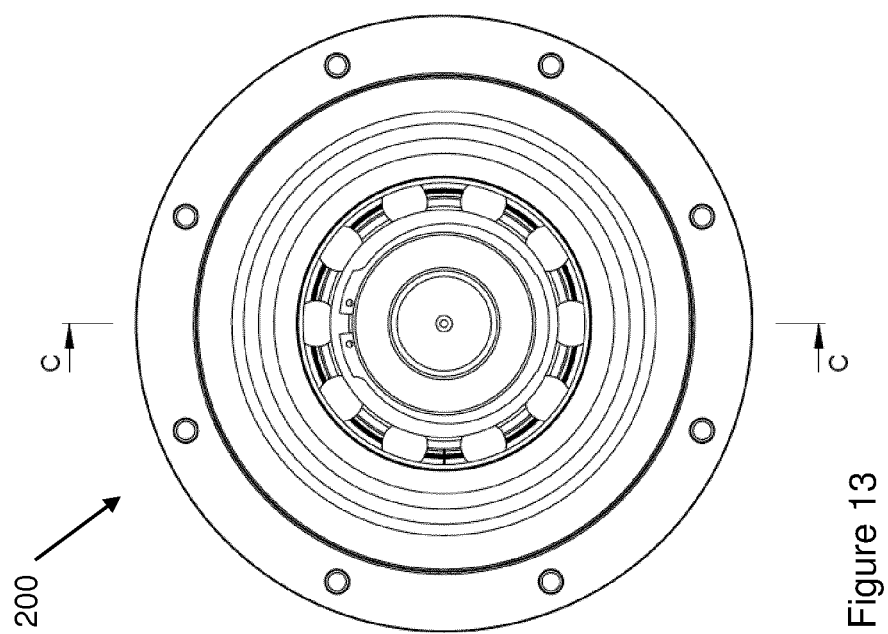
FIG. 13: is a laterally cut-out illustration of a drive shaft connecting unit according to the disclosure in the coupled state.
Figure 15:
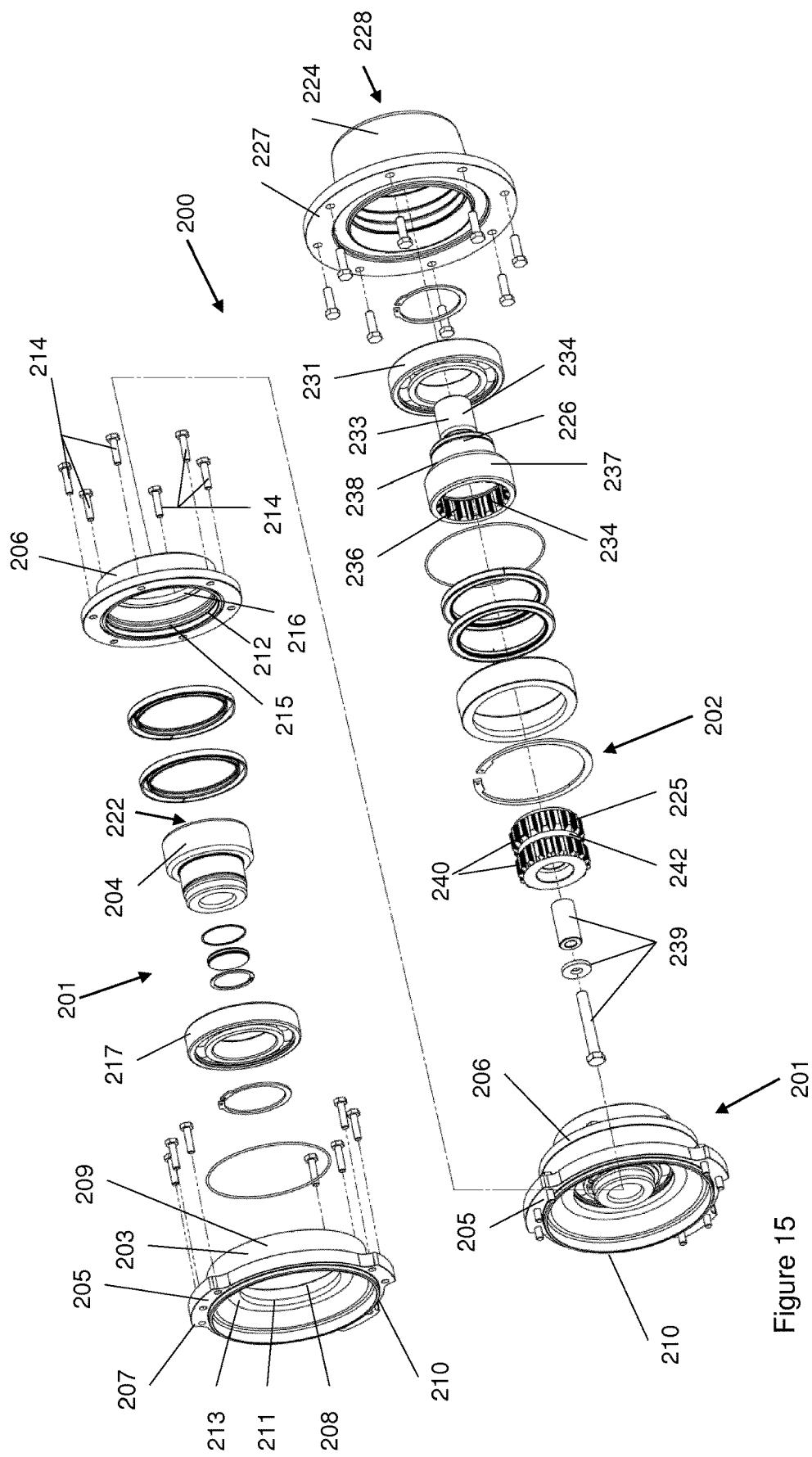

A drive shaft connecting unit according to the disclosure 200 is described below on the basis of an exemplary embodiment (see FIGS. 13 to 15). The drive shaft connecting unit 200 comprises a vehicle-side drive shaft connecting device according to the disclosure 201 and an accessory-side drive shaft connecting device 202 which can be releasably and interlockingly connected thereto and coupled therewith (FIGS. 13 to 15).

The vehicle-side drive shaft connecting device 201 comprises a bearing seat 203 and a coupling hub 204 held therein so that it can swivel. The bearing seat 203 is preferably a component of the vehicle-side drive shaft connecting device 201 and is preferably connected by means of a screw connection to a docking socket 31 of a vehicle. Alternatively the bearing seat can also be connected to the docking socket 31 by means of a welded joint. The bearing seat 203 is split in two and has a vehicle-side connecting flange 205 and a coupling-side cover plate 206. The roughly tubular connecting flange 205 has a fastening section 207 and a bearing section 208. The fastening section 207 is moulded on the vehicle-side onto an outside jacket wall 209 of the connecting flange 205 and is approximately circular in shape.

A radially circumferential centering shoulder 210 is formed on the vehicle-side end of the connecting flange 205 for centering the vehicle-side drive shaft connecting device 201 relative to a coupling device, preferably a docking socket 31. The fastening section 207 on the coupling-side in its passage 211 forms part of a bearing retaining seat 212 and within this region has a radially circumferential shoulder 213. The cover plate 206 is connected to the connecting flange 205 by means of corresponding connecting units, preferably screw connections 214. Furthermore the cover plate 206 on the vehicle-side forms part of a bearing retaining seat 212. This part of the bearing retaining seat 212 is limited by a radially circumferential shoulder 215, whereby a coupling-side passage 216 for the coupling hub 204 is provided in the cover plate 206.

A bearing device 217 is arranged in the bearing retaining seat 212, such as e.g. a one or two row ball bearing 217. The coupling hub 204 is held by means of this bearing device 217 so that it can swivel in the bearing seats 203, 212. A jacket wall of a tubular vehicle-side drive shaft retaining section 219 of the coupling hub 204 is arranged in the bearing device 217.

The power takeoff retaining section 219 is tubular and has internal toothing 220 for connecting to correspondingly formed external toothing of a drive shaft (not illustrated) of a vehicle (not illustrated). The power takeoff retaining section 219 is closed on its vehicle-side end by a gasket 221, in order to prevent leakage of axle oil.

On the coupling-side the coupling hub 204 has a cup-shaped or hollow-cylindrical coupling section 222 with internal toothing 223 for connecting to a correspondingly formed element of the accessory-side drive shaft connecting device 202. Here the internal toothing 223 is formed so that the teeth are axially chamfered in the direction of the coupling-side front surfaces or at least formed with chamfers, so that the teeth 222 on the coupling-side towards the internal hollow-cylindrical coupling section form finding cones for pushing in the internal toothing, so that the internal toothing, which here is yet to be described later, slides along on the pointed areas of the teeth, or the chamfers of the teeth along the internal toothing and thus an outer toothed interior stump slides into the hollow-cylindrical coupling section 222 and the toothings slide into each other, whereby possibly on the driving end or on the output-side decoupling takes place, so that at least one of the coupling elements having toothing can freely pivot into the other one.

The accessory-side drive shaft connecting device 202 comprises a cup-shaped or hollow-cylindrical bearing seat 224, a coupler 225 and a bearing shaft 226. The bearing seat 224 is connected to a docking insert 32 by means of a screw connection. Alternatively the bearing seat can also be an integral component of the docking insert 32. The bearing seat 224 comprises a circular connecting section 227 for connecting the accessory-side drive shaft connecting device 202 to the docking insert, e.g. by means of corresponding screw connections. A passage 228 is provided on an accessory-side end of the bearing seat 224, which forms a bearing retaining section 229. This bearing retaining section on the accessory-side is limited by a radially circumferential shoulder 230.

A bearing device 231, such as e.g. a ball bearing, is arranged in this bearing retaining section 229. The bearing shaft 226 is held in the bearing device 231 so that it can swivel. At its outside jacket wall a bearing section 232 is formed on the bearing shaft 226, which is connected to the bearing device 231. On the accessory-side the bearing shaft 226 has a shaft stump 233 with external toothing 234, which is provided for connecting to a drive shaft of an accessory. On the coupling-side the bearing shaft 226 has a cup-shaped or hollow-cylindrical coupler slot 236. The coupler slot 236 on its outside jacket wall 237 has a radially circumferential shoulder 238, which limits the bearing section 232. The coupler 225 is arranged in the cup-shaped coupler slot 236 of the bearing shaft 226 and fixed by means of a screw connection 239. On the coupling-side the cylindrical coupler 225 has external toothing 240 for coupling with correspondingly formed internal toothing 223 of the coupling hub 204. A circumferential radial groove 242 is axially located in approximately the centre of the coupler 225, the external toothing 240 being divided into coupling-side external toothing 240 and external toothing 242, which rests in the hollow-cylindrical coupler slot 236 and there in corresponding internal toothing 243. In the mounted state of the coupler 225 the axial groove 242 finishes in the coupler slot 236 on an axial front wall of the coupler slot 236.

The external toothing 240 of the coupler 225 on the coupling-side, i.e. towards the coupling hub 204 preferably has chamfered converging flanks or chamfered front surfaces so that the corresponding teeth are axially tapered with control surfaces (not shown), such that when the drive shaft connecting device 201 and the drive shaft connecting device 202 are coupled together the teeth with the finding cone formed by the chamfers slide into one another and the teeth of the internal toothing and external toothing are prevented from axially stacking up as a result.

The coupling devices 201 and 202 described above can also naturally be present on the corresponding coupling devices of the vehicle and of the attachment axle or of the accessory. It is however essential according to the disclosure that both drive shaft connecting devices 201, 202 are axially firmly locked on a docking device of a vehicle or an accessory or an auxiliary axle in each case, so that in the case of mechanical coupling of the docking devices 31, 32 the drive shaft connecting devices 201 and 202 are coupled by force. Of course for this purpose the docking devices 31, 32 or the seats for the respective drive shaft connecting devices 201, 202 are accurately manufactured so that if the coupling devices 31, 32 are telescoped into each other, the drive shaft connecting devices are aligned absolutely coaxially or axially flush with one another.

If necessary, it can be proposed that at least one of the drive shaft connecting devices 201, 202 is provided with slight play for balancing out small tolerances, whereby the play is possibly flexibly absorbed by a corresponding flexible ring or the like, so that small tolerances can be balanced out, in order to avoid any tension. Diaphragm springs (not illustrated) can be provided in the bearing retaining sections 229, 212 between the bearing devices 217, 231 and the corresponding shoulders 213, 230, in order to protect the bearing devices 217, 231 from damage. Furthermore rotary shaft seals 241 are arranged between the bearing device 217 and the cover plate 206 of the vehicle-side drive shaft connecting device. Furthermore rotary shaft seals 241 are also provided between the cup-shaped bearing shaft 226 and the bearing seat 224 of the accessory-side drive shaft connecting device 202. The drive train can also be extended in such a manner that an auxiliary engine is connected by a corresponding drive shaft connecting unit to the drive train.

In line with the docking system according to the disclosure an auxiliary engine can be coupled on the front or on the rear of the vehicle. The output of the vehicle and auxiliary motor is combined and variably distributed to the main drive, attachment and auxiliary drives. Power takeoff operated accessories can optionally be coupled either with the opposite docking slot or with a docking socket on the auxiliary engine module. It is thus possible to deliver the entire output of the vehicle and auxiliary engine via the power takeoff to the attachment or variably distribute this to the accessory, main drive and auxiliary drive.

A coupling system is described below (FIGS. 1 to 12). A docking socket 31 of a docking device 30 (coupling unit) is described below by way of example for inserting a docking insert 32 (coupling device) on the basis of an exemplary embodiment. The docking socket 31 comprises a roughly U-shaped pre-centering device 33 with an entry well 35 which approximately conically tapers in an entry direction 34 for pre-centering a docking insert 32 formed corresponding to the docking socket.

Furthermore at least a first and a second centering device 36, 37 are provided on the docking socket 31, whereby the first and the second centering device 36, 37 in each case comprise two coupling elements and/or counter coupling elements for connecting to corresponding coupling elements and/or counter coupling elements of a docking insert 32. Furthermore the first and the second centering device 36, 37 are designed to center the docking insert 32 relative to the docking socket 31 along four centering axes 38 corresponding to the four coupling or counter coupling elements in the entry direction 34. Besides the docking socket 31 comprises a draw-in device with two hydraulically operated hooks 44 for drawing the docking insert 32 into the docking socket 31 in the entry direction 34. The docking socket 31 comprises two docking walls 39, 40 extending in the vertical direction and arranged in the horizontal direction offset to each other. These two docking walls 39, 40 are connected to one another for instance by the entry well 35 extending in the horizontal direction.

Accordingly a first docking wall 39 is arranged in the vertical direction in the region underneath the entry well 35 and a second docking wall in the horizontal direction is arranged above the entry well 35 to limit the entry well 35. The entry well takes over the function of pre-centering when inserting a docking insert in the docking socket by receiving an element of the docking insert 32 formed corresponding to the entry well 35. For pre-centering the docking insert 32 when inserting in the docking socket 31, the geometry of the entry well 35 tapers in the entry direction 34 in order to enable pre-centering of the docking insert.

Internal and outside side walls 41, 42 are provided on both sides of the entry well 35 extending in the vertical direction roughly transversely to the entry direction 34. These internal and outside side walls 41, 42 are arranged at a pre-determined angle in the entry direction 34 so that an uptake space 43, limited by the internal side walls 41 and the entry well 35, tapers in the entry direction. Gripping spigot ducts 45, which are provided for guiding and taking up corresponding gripping spigots located on a docking insert 32 are formed in the internal side walls 41. Shafts are arranged in the internal and outside side walls 41, 42 in corresponding drillings, on which the hooks 44 are held so that they can swivel. Thus the hooks are arranged in a hook area limited by the internal and outside side walls. The hooks can be operated by corresponding hook cylinders 46.

Bush-shaped guide spigot slots 47 (counter coupling elements) are provided in the region of the first docking wall 39, which forms the first centering device 36 of the docking socket 31. Initially the first docking wall 39, which has two drillings 48 for holding the bush-shaped guide spigot slots 47, is provided in the entry direction 34. The bush-shaped guide spigot slots 47 are arranged in the drillings 48. The bush-shaped guide spigot slots 47 are thus arranged in the entry direction 34 behind the first docking wall 39. The bush-shaped guide spigot slots 47 comprise a tubular entry/centering section 49 and a backup section 54 in the entry direction 34.

The tubular entry/centering section 49 has a conically tapering entry recess 50, whereby a vertical front surface, arranged against the entry direction 34, protrudes from the first docking wall 39 and forms a first axial stop surface 51 of a first stop device 52. Dirt exhausting grooves 53 are formed in this circular first stop surface 51 which are radially circumferential and equally spaced apart from each other for taking up and removing impurities. Such contamination would change the position of the stop. This is generally disadvantageous in that accurate coupling between docking socket and docking device is not possible. The tubular entry/centering section 49 has a cylindrical centering recess 55 in the entry direction 34 adjoining the entry recess. The tubular backup section 57 on a circular front surface has drillings 56 lying against the entry direction 34 for connecting to the first docking wall 39, for example by means of corresponding screw connections. This front surface has a larger diameter than the tubular entry/centering section 49 and in this way forms a radially circumferential stop shoulder, which prevents the bush-shaped centering slot from shifting against the entry direction 34.

This embodiment has the advantage that the longitudinal forces, which on the one hand are masked by accessories and on the other hand by the wedge forces of the wedge forks do not need to be inserted by screwing into the docking socket. Furthermore slots 58 extending in the vertical direction are located in the tubular backup section 57 for holding the hydraulically operated wedge forks 59. The wedge forks 59 are provided for fixing a corresponding guide spigot of a docking insert 32 and so that they can be adjusted in the vertical direction from a release position into a fixing position. The wedge forks 59 thus form an axial protection device 60.

Approximately centrally in the first docking wall 39 a drive shaft connecting device is provided in the region between the two bush-shaped guide spigot slots 47. A drive shaft connecting device 67 is part of a drive shaft connecting unit for connecting a vehicle-side end of a drive shaft to an accessory-side end of a drive shaft. A recess 66 is formed in the second docking wall 40 to take up a coupling plate for making available electrical, electronic, hydraulic and/or pneumatic connections between a vehicle and an accessory.

The coupling plate with the flanged on valve block can be removed very simply and quickly against the entry direction 34 by only undoing four screws for repair purposes. Furthermore two guide spigots 61 (coupling elements) extending against the entry direction 34 are provided in the region of the second docking wall 40, which form the second centering device 37 of the docking socket 31. The guide spigots 61 in the entry direction 34 have a conical entry section 62 and a cylindrical centering section 63 adjoining thereto. A circular vertical front surface lying in front in the entry direction 34 adjoining the centering section 63 forms a second stop surface 64 of a second stop device 65.

The coupling elements and/or the counter coupling elements of the first and the second centering device thus form at least two axial stop devices, which limit any relative movement between docking socket and docking insert in the entry direction. The stops are preferably formed on the first and/or second guide spigots and/or on the first and/or second centering recesses level with the circular stop surfaces extending perpendicularly to the entry direction. Approximately centrally in the second docking wall 40 a power takeoff connecting device 68 is provided in the region between the two guide spigots 66. A power takeoff connecting device 68 is part of a power takeoff connecting unit for connecting a vehicle-side end of a power takeoff to an accessory-side end of a power takeoff.

The docking socket is positioned by means of a large (diameter approx. 258 mm), mechanically processed drilling in the first plate on a centering insert on a central tube flange of an axle center piece. This precision means a connecting shaft with geared sleeves can be used for connecting the power takeoff output of the transmission and of the power takeoff connecting device. An expensive and above all not maintenance-free connection by means of a cardan shaft is therefore unnecessary. The docking insert according to the disclosure 32 is described below by way of example. The docking insert 32 is formed corresponding to the docking socket 31. The docking insert 32 firstly has a first docking wall 70 in the entry direction 34. The first docking wall 70 essentially extends in the vertical direction and on the under-side has an under-wall 89 corresponding to the entry well 35 of the docking socket 31.

Furthermore approximately centrally a drive shaft connecting device is provided on the first docking wall 70. Corresponding to the guide spigot slots 47 of the first centering device 36 of the docking socket 31, first guide spigots 71 of a first centering device 72 of the docking insert 31 extending in the entry direction 34 are formed on the first docking wall 70 of the docking insert 32. The first guide spigots 71 in the entry direction 34 have a cylindrical centering section 73 and a conical entry section 74 adjoining thereto. Furthermore the first guide spigots 71 have circular first stop surfaces 93 against the entry direction, which form a first stop device 94 of the first centering device 72. Convex wedge fork slots 74 corresponding to the wedge forks 59 and extending in the vertical direction are provided in the cylindrical centering section 73. An entry body 75 extending in the entry direction is provided on the first docking wall for arranging in the uptake space 43 of the docking socket 31.

In the entry direction the entry body 75 in front has a second docking wall 76 extending roughly in the vertical direction. Corresponding to the second guide spigots 61 of the second centering device 37 of the docking socket 31, suitable guide spigot slots 77 of a second centering device 78 of the docking insert 32 are formed on the second docking wall. The second docking wall 76 has two drillings 80 for receiving the bush-shaped guide spigot slots 77. The bush-shaped guide spigot slots 77 are arranged in the drillings 80. The bush-shaped guide spigot slots 77 comprise a centering section 82 and an entry section 81 in the entry direction 34.

The tubular entry section 81 has a conically tapering entry recess 83, whereby a front surface, arranged against the entry direction 34, protrudes from the second docking wall 76 and forms a second axial stop surface 84 of a second stop device 85. This circular second stop surface 85 has dirt exhausting slots 86 which are radially circumferential and equally spaced apart from each other for taking up and removing impurities. The tubular centering section 82 has a cylindrical centering recess 87 against the entry direction 34 adjoining the entry recess 83.

A power takeoff connecting device is arranged in the region between these guide spigot recesses 77. A coupling disk slot is formed in the vertical direction in the region above the second centering device 78. Furthermore extending transversely to the entry direction 34 a gripping spigot shaft 88 is arranged on the entry body 75. The ends of the shaft form gripping spigots 89. These gripping spigots 89 when the docking insert 32 is inserted into the docking socket 31 are gripped by the hooks 44 of the docking socket 31 and afterwards by means of the hydraulically operated hooks 44 the docking insert 32 is drawn into the docking socket 32, whereby an under-wall 90 of the entry body 75 of the docking insert 32 slides accordingly in the entry well 35 of the docking socket 31.

Apart from an axial locking unit as protection device 60 the hydraulic wedge forks also have another second locking device extending transversely to the entry direction. The second locking device comprises a pneumatically operated backup body, which fixes the wedge forks in the guide spigot sockets.

This second locking operation can only take place if the hydraulic wedge fork is correctly positioned. Accordingly a sensor is provided, in order to check the position of the hydraulic wedge forks. Wedge forks have the advantage that they can be easily automated. The wedge forks every time are held in the wedge fork slots.

In accordance with an alternative embodiment it can also be proposed that the centering devices or their centering elements (spigots, sockets) are exchanged. Here it is only of crucial importance that both the two guide spigots, or centering recesses of the first and the second centering device, are formed in such a manner that all four components enable simultaneous centering, since an accessory arranged on the docking insert is often very heavy and accordingly exact centering in the axial entry direction is necessary.

A coupling plate 100 is described below. A coupling plate 100 is provided for making electrical, electronic, hydraulic and/or pneumatic connections. This coupling plate 100 comprises a roughly flat basis plate 101. This basis plate 101 can be provided with a large number of electrical, electronic, hydraulic and/or pneumatic as well as mechanical connections. At least two hydraulic connectors 113 are formed on the basis plate 101. These two hydraulic connectors 113 are provided to operate jacks found on almost all connectable modules.

At least one electronic connecting device 102 is also provided on the basis plate 101 for making an electronic connection available between the control equipment of a vehicle and the control equipment of an attachment. This electronic connection serves to identify the type of module that is to say trailer or accessory. Furthermore at least one electrical connecting device 103 is arranged on the basis plate 101. This electrical connecting device is provided to operate a light (e.g. brake, front, rear, position or warning light) on the attachment. Furthermore there are two electrical control contacts 104 which are electrically connected together by coupling the docking insert 32 with the docking socket 31, in order to detect whether the docking insert 32 has completely docked with the docking socket 31 and whether a securing and/or locking device can be activated.

Beside the minimum connecting devices mentioned above the coupling plate has a centering device 105. This centering device 105, if the coupling plate 100 for the docking socket 31 is provided, comprises at least two guide spigots 106, whereby the corresponding centering recesses 107 are formed on a coupling plate of the docking insert 32 accordingly. The centering device comprises at least two coupling (guide spigots 106) and/or counter coupling elements (centering recesses 107). Furthermore three connection drillings 108 are provided in a coupling plate 100 for connecting the coupling plate 100 to a docking insert 32 or a docking socket 31.

Tubular plastic sleeves 109 and/or rubber mounts are provided in these connection drillings 108, preferably of the docking insert 32, which can be made from a flexible material, in order to allow slight play and increase the precision when connecting two coupling plates in such a way. Connecting units 111, such as e.g. screws, can be arranged in corresponding recesses 110 of the plastic sleeves 109, in order to connect the coupling plate 100 to a coupling device e.g. a docking insert 32 or a docking socket. The plastic sleeves 109 form a bearing device 112 in conjunction with the connecting units 111. Pneumatic connectors 114 are also provided on the basis plate 101. Features of the coupling plate are described in detail below.

A vehicle-side coupling plate 100 comprises the roughly flat basis plate 101, in which on the accessory-side an electrical connecting device 103, and/or connecting device 102 such as e.g. electrical plugs 102, hydraulic connectors 113, such as e.g. hydraulic couplings 113 and pneumatic connectors 114 such as e.g. compressed air couplings as well as centering spigots 106 can be arranged for fine centering of the accessory-side coupling plate. On the vehicle-side a valve block 115 with up to six double acting hydraulic controllers (not illustrated) is flanged on.

The coupling plate 100 is hydraulically designed in such a manner that for a hydraulic operation only the pressure-, tank- and load reporting lines are connected. The line between these main connections and the couplings of a power beyond system as well as the supply to the valve block 115 is integrated in the basis plate 101. The basis plate 101 is firmly bolted to a vehicle-side docking socket 31 by means of connecting units 111.

The device-side coupling plate 100 on the docking insert comprises the corresponding push-pull plugs and couplings and is firmly connected to a docking insert 32 by the bearing device 112 and/or the plastic sleeves 109 and the connecting units 111. —The bearing device 112 is thus formed to allow slight play of the coupling plate in a vertical and horizontal plane relative to a coupling device. This enables the coupling plate 100 to be finely centered by means of the plastic sleeves 109 or rubber bushes and the drillings provided therein in relation to the vehicle-side guide spigots 106 in order to reach precise alignment necessary for hydraulic coupling within the range of 0.05 mm. Two coupling plates 100 are connected by coupling a docking insert 32 with a docking socket 31. When connecting two coupling plates according to the disclosure 100 it is accordingly proposed that the guide spigots 106 of a coupling plate connected to a docking socket 31 penetrate the corresponding centering recesses 105 of a coupling plate according to the disclosure 100 connected to a docking insert 32 and in this way align the two coupling plates 100 precisely to each other particularly in a vertical connection plane. In this way all electrical, electronic, hydraulic and/or pneumatic connections provided on docking insert 32 and docking socket 31 are interconnected.

A procedure for docking or inserting the docking insert in the docking socket or a procedure according to the disclosure for connecting a docking insert to a docking socket is described below. Firstly the entry body 75 of the docking insert is placed within the region of the uptake space 43 of the docking socket 31, preferably by moving the vehicle and thus the docking socket 31 arranged thereon. Here the docking insert is pre-centered in the docking socket by sliding the under- or entry wall 90 of the docking insert 32 in the entry well 35 of the docking socket 31. After a relative movement in the entry direction by a pre-determined length, the hooks 44 of the docking socket are operated by means of the hook cylinders 46 and lowered downwards firstly in the vertical direction, so that catch recesses 69 of the hooks 44 engage the gripping spigots 89 of the docking insert. Thus firstly the docking insert is placed in the docking socket by moving the vehicle. Here pre-centering takes place. Subsequently, the hooks engage and pull the docking insert in the entry direction into the docking socket.

Two rollers, which are held so that they can swivel in the docking socket, form a sliding block guide with a slot in the hook and a track on the top of the hook. This sliding block guide means that the hooks when they come out firstly move in the vehicle longitudinal direction and then move upwards. Thus an opening results in which the gripping spigots are inserted when they are brought into the docking insert. When the catching hooks are drawn in the hooks firstly move downwards and engage with the gripping spigots. Then the docking insert is drawn in.

Subsequently, the gripping spigots slide along a gripping spigot duct 45 in the internal side walls 41 of the docking socket 31, whereby the gripping spigots 89 in the gripping spigot duct 45 are only arranged with slight play. As the result of a further movement of the docking insert 31 in the entry direction 34 afterwards further centering of the docking insert 32 takes place in the docking socket 31 by means of the first and second centering devices 36, 37, 72, 78 of the docking socket 31 and the docking insert 32 along the four centering axes 38. Here the two guide spigots 71 of the first centering device 72 of the docking insert 32 with their conical entry sections 74 slide into the conical entry openings 50 of the two guide spigot slots 47 of the first centering device 36 of the docking socket 31.

At the same time the conical surfaces of the entry sections 62 of the guide spigot 61 of the second centering device 37 of the docking socket 31 slide into the entry recesses 83 of the guide spigot slots 77 of the second centering device 78 of the docking insert 32. As a result of a further movement of the docking insert 31 in the entry direction 34 afterwards further fine centering of the docking insert 32 takes place in the docking socket 31.

Here the two guide spigots 71 of the first centering device 72 of the docking insert 32 with their cylindrical centering sections 73 slide into the cylindrical centering recesses 55 of the two guide spigot slots 47 of the first centering device 36 of the docking socket 31. At the same time the cylindrical centering sections 63 of the guide spigot 61 of the second centering device 37 of the docking socket 31 slide into the centering recesses 87 of the guide spigot slots 77 of the second centering device 78 of the docking insert. The movement of the docking insert 32 in the entry direction 34 to the docking socket 31 is limited by the first stop surfaces 51, 93 of the first stop devices 52, 94 of the first centering device 36, 72.

Furthermore the movement of the docking insert 32 in the entry direction 34 to the docking socket 31 is limited by the second stop surfaces 64, 84 of the second stop devices 65, 85 of the first centering device 36, 72. As soon as the stop surfaces 51, 93 of the first stop devices 52, 94 and the stop surfaces 64, 84 of the second stop device 65, 85 line up together, the entry of the docking insert 32 into the docking socket 31 is limited in the axial direction. The docking insert 32 is now completely inserted in the docking socket 31.

Preferably electrical contacts (not illustrated), which contact each other, are provided both on the docking insert 32 and on the docking socket 31, as soon as the docking operation has finished. A signal generated in this way is used, in order to shift the operating cylinders 95 of the hydraulically operated wedge forks 59 in the vertical direction downwards in such a manner that forks of the wedge forks 59 engage in the slots 58 of the backup section 57 of the first guide spigots 71 of the first centering device 72 of the docking insert and in addition to the hooks 44 prevent the docking insert 32 decoupling from the docking socket 31.

To protect the wedge forks a pneumatically operated locking device 91 is provided in order to bring corresponding locking spigots 96 through interlock drillings 97 formed in the backup section 57 and in the forks of the wedge fork 59 and in this way fix and secure the position of the wedge fork 59. At the same time possibly power takeoff connecting devices and/or drive shaft connecting devices of the docking socket 31 and the docking insert 32 are connected to one another in this end position.

REFERENCE SYMBOL LIST 30 docking device
31 docking socket
32 docking insert
33 pre-centering device
34 entry direction
35 entry well
36 first centring device
37 second centring device
38 centring axes
39 first docking wall
40 second docking wall
41 internal side wall
42 external side wall
43 uptake space
44 hook
45 gripping spigot duct
46 hook cylinder
47 guide spigot slot
48 drilling
49 entry/centring section
50 conical entry opening
51 first axial stop surface
52 first stop device
53 dirt exhausting groove
54 tubular centring section
55 cylindrical centring recess
56 drilling
57 backup section
58 slot
59 wedge fork
60 axial protection device 61 guide spigot
62 entry section
63 centring section
64 second stop surface
65 second stop device
66 recess
67 drive shaft connecting device
68 power takeoff connecting device
69 catch recess
70 first docking wall
71 first guide spigot
72 first centring device
73 cylindrical centring section
74 wedge fork slot groove
75 entry body
76 second docking wall
77 guide spigot slot
78 second centring device
79 coupling disk slot
80 drilling
81 backup section
82 centring section
83 entry recess
84 second stop surface
85 second stop device
86 dirt exhausting groove
87 centring recess
88 gripping spigot shaft
89 gripping spigot
90 under-wall
91 locking device
92 wedge fork retaining groove
93 first stop surface
94 first stop device
95 operating cylinders wedge fork
96 locking spigot
97 interlock drilling
100 coupling plate
101 basis plate
102 electronic connecting device
103 electrical connecting device
104 electrical control contact
105 centring device
106 guide spigot
107 centring recess
108 connection drilling
109 plastic sleeve
110 recess
111 connecting unit
112 bearing device
113 hydraulic connector
114 pneumatic connector
115 valve block
200 drive shaft connecting unit
201 vehicle-side drive shaft connecting device
202 accessory-side drive shaft connecting device
203 bearing seat
204 coupling hub
205 connecting flange
206 cover plate
207 fastening section
208 bearing section
209 jacket wall
210 centring shoulder
211 passage
212 bearing retaining seat
213 shoulder
214 screw connection
215 shoulder
216 passage
217 bearing device
218 jacket wall
219 drive shaft retaining section
220 internal toothing
221 gasket
222 coupling section
223 internal toothing
224 bearing seat
225 coupler/coupling shaft
226 bearing shaft
227 connecting section
228 passage
229 bearing retaining section
230 shoulder
231 bearing device
232 bearing section
233 shaft stump
234 external toothing
235
236 coupler slots
237 jacket wall
238 shoulder
239 screw connection
240 external toothing
241 rotary shaft seal
242 circumferential radial groove

The invention claimed is:

1. A drive shaft connecting unit with a vehicle-side drive shaft connecting device and an accessory-side drive shaft connecting device, wherein the drive shaft connecting devices of the drive shaft connecting unit are configured to couple a vehicle and an attachment or an accessory and wherein the vehicle-side drive shaft connecting device and the accessory-side draft shaft connecting device are axially connected that in the case of mechanical coupling of the vehicle with an auxiliary axle or a trailer or an accessory the vehicle-side drive shaft connecting device and the accessory-side drive shaft connecting device are coupled by force with one another;

wherein the vehicle-side drive shaft connecting device comprises:
    a bearing seat and a coupling hub held so that the coupling hub can swivel therein, the bearing seat being split into two and having
        a vehicle-side connecting flange and
        a coupling-side cover plate, wherein the vehicle-side connecting flange has
            a fastening section and a bearing section on the vehicle-side on an outside jacket wall has a radially circumferential centering shoulder for centering the vehicle-side drive shaft connecting device relative to a coupling device or a vehicle and
            a circular connecting section for connecting the vehicle-side drive shaft connecting device to the coupling device or to the vehicle and
            wherein the fastening section forms a coupling-side portion of a bearing retaining seat, the bearing seat having a radially circumferential shoulder, and
        wherein the cover plate is connected by means of corresponding connecting units to the vehicle-side connecting flange, and
        wherein the cover plate forms a vehicle-side portion of the bearing retaining seat, which has the radially circumferential shoulder and a coupling-side passage for the coupling hub and wherein a bearing device is arranged in the bearing retaining seat by means of which the coupling hub is held in the bearing seat so that the coupling hub can swivel and the bearing device is connected to the outside jacket wall of a vehicle-side drive shaft retaining section of the coupling hub and the drive shaft retaining section having internal toothing for connecting to correspondingly formed external toothing of a drive shaft of the vehicle and the coupling hub on the coupling-side having a cup-shaped coupling section internal toothing for connecting to a correspondingly formed element of the accessory-side drive shaft connecting device.

2. The drive shaft connecting unit according to claim 1, wherein the vehicle-side drive shaft connecting device and the accessory-side drive shaft connecting device comprise a coupling element, each, such that when the coupling elements telescope into each other, the vehicle-side drive shaft connecting device and the accessory-side drive shaft connecting device are connected by force, wherein the internal toothing of one of the vehicle-side or accessory-side drive shaft connecting device coaxially engages the external toothing of the other of the vehicle-side or accessory-side drive shaft connecting device, so that a coupling by force is actuated by way of axial telescoping.

3. The drive shaft connecting unit according to claim 1, wherein the vehicle-side drive shaft connecting device and accessory-side drive shaft connecting device are axially fixed by mechanical connection of the coupling elements.

4. The drive shaft connecting unit according to claim 1, wherein the vehicle-side drive shaft connecting device (201) possesses the bearing seat (203) and the coupling hub (204), held so that the coupling hub (204) can swivel therein, wherein the coupling hub (204) has a cup-shaped or hollow-cylindrical coupling section (222) with the internal toothing (223) for connecting to a correspondingly formed element of the accessory-side drive shaft connecting device (202).

5. The drive shaft connecting unit according to claim 1, wherein the accessory-side drive shaft connecting device (202) possesses a cup-shaped and/or hollow-cylindrical bearing seat (224), a cylindrical coupler (225) and a bearing shaft (226), wherein the cylindrical coupler (225) possesses a coupling-side external toothing (240) for coupling with the correspondingly formed internal toothing (223) of the coupling hub (204).

6. The drive shaft connecting unit according to claim 5, wherein the bearing seat (203) is connected to a docking socket 31 connected to one of a vehicle or an accessory and the bearing seat 224 is connected to a docking socket 32 connected to the other of a vehicle or an accessory by means of a screw connection or a welded joint or another fixing connection.

7. The drive shaft connecting unit according to claim 1, wherein the external toothing (240) of a cylindrical coupler (225) and the corresponding internal toothing (223) of a hollow-cylindrical coupling section (222) of the coupling hub (204) are formed such that the teeth are axially chamfered towards coupling-side front surfaces with converging flanks, such that the internal toothing and external toothing can slide along the converging flanks or chamfers during the coupling operation so that the each of the internal and external toothings can rotate in and slide into one another.

8. The drive shaft connecting unit of claim 1, wherein an accessory-side drive shaft connecting device comprises:

a cup-shaped bearing seat, a cylindrical coupler and a bearing shaft, the cup-shaped bearing seat having a circular connecting section for connecting the accessory-side drive shaft connecting device to a coupling device or to an accessory, wherein a bearing retaining section is formed in a passage on an accessory-side end of a bearing device, which is limited on the accessory-side by a radially circumferential shoulder and is arranged in the bearing retaining section of the bearing device, wherein the bearing shaft is held in the bearing device so that the bearing shaft can swivel, the bearing shaft connected to the bearing device with a bearing section formed on the outside jacket wall, and wherein the bearing shaft has an accessory-side shaft stump with external toothing for connecting to a drive shaft of the accessory, and wherein on the coupling side, the bearing shaft has a cup-shaped coupler slot, the cup-shaped coupler slot on the outside jacket wall having a radially circumferential shoulder, which limits the bearing retaining section, and wherein the coupler is firmly arranged by means of a screw connection in the cup-shaped coupler slot of the bearing shaft and the cylindrical coupler on the coupling-side having external toothing for coupling with the correspondingly formed internal toothing of the coupling hub.

9. The drive shaft connecting device of claim 8, further comprising rotary shaft seals between the cup-shaped bearing shaft and the bearing seat of the accessory-side drive shaft connecting device.

10. The drive shaft connecting device of claim 1, further comprising diaphragm springs in the bearing retaining sections between the bearing devices and the corresponding shoulders.

11. The drive shaft connecting device of claim 1, further comprising rotary shaft seals arranged between the bearing device and the cover plate of the vehicle-side drive shaft connecting device.

12. A vehicle with a vehicle-side drive shaft connecting device according to claim 1.

13. An accessory, auxiliary axle or trailer with an accessory-side drive shaft connecting device according to claim 1.

* * * * *